United States Patent [19]

Schnell et al.

[11] Patent Number: 4,543,145
[45] Date of Patent: * Sep. 24, 1985

[54] PROCESS AND APPARATUS FOR THE CONTINUOUS PRODUCTION OF SINGLE-PLY OR MULTI-PLY WEBS OF HEAT-CURABLE RESIN

[75] Inventors: Peter Schnell, Absam; Gustav Bihlmayer, Steyr; Dietrich Daume, Linz, all of Austria

[73] Assignee: Chemie Linz Aktiengesellschaft, Linz, Austria

[*] Notice: The portion of the term of this patent subsequent to Aug. 24, 2000 has been disclaimed.

[21] Appl. No.: 197,413

[22] Filed: Oct. 16, 1980

[30] Foreign Application Priority Data

Oct. 19, 1979 [DE] Fed. Rep. of Germany ....... 2942413

[51] Int. Cl.$^4$ .......................... B44C 1/00; B65C 9/25; C09J 5/00; B28B 9/00
[52] U.S. Cl. .................................. 156/231; 156/238; 156/246; 156/307.7; 156/324; 156/330; 427/346; 264/241
[58] Field of Search ............ 156/231, 230, 238, 244.27, 156/244.19, 246, 277, 289, 500, 5, 241, 240, 249, 298, 307.7, 324, 324.4, 330; 118/257, 200; 68/204, 200; 354/318, 317; 264/216, 241, 299, 288.4; 425/111, 112, 406; 427/195, 176, 397.7, 346

[56] References Cited

U.S. PATENT DOCUMENTS

| | | | |
|---|---|---|---|
| 2,681,870 | 6/1954 | Novak | 118/257 |
| 3,876,485 | 4/1975 | Kinlock et al. | 156/246 |
| 4,061,811 | 12/1977 | Takase et al. | 427/346 |
| 4,233,358 | 11/1980 | Jones et al. | 156/230 |

FOREIGN PATENT DOCUMENTS 349366 4/1979 Austria .

OTHER PUBLICATIONS

P. Shelden, Glass-Fiber Reinforced Plastics (1967) pp. 558, 612.
Glass Fiber-Reinforced Polyesters and Other Thermosetting Resins, Zechner & Huthig Verlag GmbH, (1966) p. 332.

*Primary Examiner*—Edward Kimlin
*Assistant Examiner*—L. Falasco
*Attorney, Agent, or Firm*—Mark Dryer

[57] ABSTRACT

Process for the continuous production of single-ply or multi-ply laminates, comprising feeding from below and at an obtuse angle, a web uniformly coated with resin, on to a fiber web or reinforcing web which is under tension, so that the resin penetrates the fiber web or reinforcing web in a bubble-free manner, and then passing the fiber web or reinforcing web uniformly impregnated with resin, either by itself or conjointly with one or more separating films or decorative films or resin-impermeable covering films, through a heating zone and pressure zone, whereby a single-ply or multi-ply laminate is produced. Apparatus for carrying out the process is also described.

6 Claims, 1 Drawing Figure

PROCESS AND APPARATUS FOR THE CONTINUOUS PRODUCTION OF SINGLE-PLY OR MULTI-PLY WEBS OF HEAT-CURABLE RESIN

BACKGROUND OF THE INVENTION

This invention relates to a continuous process for the manufacture of fiber-reinforced or other reinforced webs of heat-curable plastics, which may be bonded to further plies, such as base films, decorative films or covering films, and to an apparatus for carrying out the process.

Processes for the continuous manufacture of webs of heat-curable resins, such as, for example, epoxy resins or polyester resins, which are fiber-reinforced or reinforced in some other way by insertion of porous materials, are known, and in these the transportation of the laminate during manufacture can be effected by an endless, circulating conveyor belt [P. Selden, Glasfaserverstaärkte Kunststoffe (Glass Fiber-Reinforced Plastics), Springer Verlag 1967, page 558]. In such processes, continuous curing mostly has been effected by heating in a long heating zone, see, for example, P. Selden, page 612; this heating zone also may be a heated belt press (Austrian Patent Specification No. 349,366).

The impregnation of the reinforcing insert, preferably a fiber mat or inserted individual filaments, with the resin is in most cases effected by the so-called dipping process, by passage through an impregnating trough (Austrian Patent Specification No. 349,366), the excess resin subsequently being removed either by means of a calibrating slit (Austrian Patent Specification No. 349,366) or by squeeze-off rollers (see E. W. Laue, Glasfaserverstärkte Polyester und andere Duromere (Glass Fiber-Reinforced Polyesters and Other Thermosetting Resins), Zechner & Hüthig Verlag GmbH, Speyer-Vienna-Zurich, page 332). These methods of resin removal lead, especially where high glass contents are employed, to fiber breakages which detract from the strength of the laminate.

It has also been proposed to apply the resin, where a continuous process is involved, by means of a doctor device (see P. Selden, pages 611 and 612).

In all these processes, care must be taken that the resin is applied uniformly and that wetting and impregnation of the fiber material is achieved without formation of air bubbles. This becomes more difficult as the glass content is increased, and in all processes a difficulty encountered is that the air introduced is released only slowly or only incompletely from the resin, sometimes being hindered from free release by items of the apparatus.

SUMMARY OF THE INVENTION

The object underlying the present invention is to provide a process by means of which it is possible to achieve, in the continuous production of a laminate, perfect impregnation, free from air bubbles, of the fiber material or reinforcing material, without having to tolerate filament breaks. Furthermore, the process also should achieve the desired result where large working widths and/or a high fiber content are selected.

It has been found that the stated object is achieved if the web, uniformly coated with resin by means of a doctor, is led, in the course of its further travel, but prior to curing, at an obtuse angle over a roller and, at the point of contact with this roller, is brought together with the reinforcing web, coming from above, in such a way that this web also describes an obtuse angle over the roller. As a result of the path of the web describing an angle instead of the level path hitherto employed, a pressure is exerted at the apex of the roller, where the resin and the reinforcing material come together, and this pressure effects complete impregnation and squeezes out the air without stressing the reinforcing fibers. The pressure is intensified still more by the fact that the fabric or fiber material to be impregnated is under tension and hence is pressed directly into the resin. Since this pressure point is at the same time the apex of an angle, exit of air is further favored.

Accordingly, the present invention provides a process for the continuous preparation of a single-ply or multi-ply reinforced web of a heat-curable resin which comprises applying a continuous resin film, by doctoring, on to a travelling web of a separating film or a film impermeable to synthetic resin, which web, in its travel, forms an obtuse angle $\alpha$, with its apex at the top, and runs horizontally or approximately horizontally after passing the apex, the resin film being applied before the apex is reached and the web, carrying the resin film, being combined, at the apex, with a pre-tensioned web, which also runs at an obtuse angle $\beta$ with its apex at the top, of a fiber material or absorbent foam, the angle $\beta$ being greater than the angle $\alpha$ but less than 180°, and having its apex, and it second (viewed in the direction of travel) horizontal or approximately horizontal arm in common with the angle $\alpha$, and subsequently curing the resin-impregnated web thus formed under pressure.

DESCRIPTION OF THE PREFERRED EMBODIMENTS

The process according to the invention permits a range of embodiments which are simple and advantageous to carry out. Thus, for example, the web coated with resin may be a separating film, for example a silicone paper, which is then pulled off the cured resin. Clean separation is effected by the release action of the film itself or by additives to the resin. In this way, a single-ply material is obtained.

It is, however, also possible to use, as the carrier film, a material which is resin-impermeable but bonds to the resin. In that case, the carrier film used is a web of, for example, an acrylonitrile/butadiene/styrene polymer, polyethylene or polyurethane, or is a metal foil, such as aluminum foil or copper foil, or is a wood veneer. If the laminate manufacture according to the invention is intended to be, for example, a ski component the carrier film, also may be, for example, the material constituting the running surface, and it is possible additionally to insert, between this carrier film and the resin, an absorbent layer carrying a decorative pattern or an inscription, for example, a paper web. In this way a ski component which may serve as the bottom layer of the ski may be produced in a single pass.

To prevent the resin surface from sticking to the pressure belt, it is advantageous to interpose a separating film. It is essential that this separating film should be applied only after the combination of the resin with the fiber material or reinforcing material at the apex of the obtuse angle in the course of travel of the web, so as not to interfere with free exit of air. Preferably, this separating film is supplied at the point at which the pressure belt begins to act on the resin surface. However, instead of a separating film, a covering film, intended to form the top ply of the laminate, may be supplied. Either this film itself may possess a decorative pattern, or a resin-permeable, absorbent decorative film additionally may be interposed between the resin and the covering film. During curing, the covering film then combines with the reinforced plastic. If desired, the underside of the covering web also may be coated with adhesive, to achieve better bonding. This covering web is preferably a thermoplastic film, as used, for example, as the upper surface of ski components. It is advantageous if the resin has been pre-cured to the B-state before applying this covering film, and this is possible if the resin-impregnated fiber web is warmed somewhat before the point at which the pressure belt comes into action. This has the advantage that it is immediately possible to carry out the pressing process under high pressures without having to tolerate losses of resin. For example it is possible to produce, in this manner, a laminate which may be employed as the upper layer of a ski.

Before reaching the point of combination with the reinforcing material, the resin film may be heated or cooled, depending upon the composition of the resin. It must, however, not yet be pre-cured at this point.

Suitable resins are heat-curable resins, such as, for example, polyesters, epoxy resins and polyurethane resins. As the reinforcing material it is possible to use both uniformly inserted individual fibers or fabrics. Products made of glass fibers, steel fibers, carbon fibers or thermoplastic fibers may be considered. However, the invention is in no way restricted to the use of fiber materials for reinforcement; instead, other porous materials, such as nets or open-pore foams equally well may be employed.

The present invention also provides an apparatus for carrying out the process according to the invention, which apparatus comprises a conveyor belt running over a first and second drive roller, supply elements adapted to deliver a carrier web and a reinforcing web on to the conveyor belt, a pressure belt which, viewed in the production direction, acts on the rear part of the conveyor belt and is driven through two further drive rollers, the said conveyor belt and any carrier web fed on to the first drive roller and being located above the conveyor belt, being led, in the upper part of the belt, which runs in the production direction, over a guide roller located in the front half of the conveyor belt between the said first and second drive rollers and underneath the said belt and in being led over the said guide roller describing an obtuse angle α with its apex at the tangent point of the guide roller, the rear arm, also viewed in the production direction, of the said angle α being substantially horizontal and in contact, over a substantial part, with the pressure belt, the part of the conveyor belt located in front of the guide roller being povided with a doctor device for applying a resin film, a lower rod being located above the conveyor belt and between the doctor and the guide roller, at a level between the periphery of the conveyor roller and the tangent point of the guide roller and at a distance from the conveyor belt which is greater than the thickness of the resin film so that a reinforcing web, kept under pretension by a brake and guided by a upper rod and the said lower rod, impinges on the resin film from above in such a manner that the said web, together with the part of the conveyor belt which is downstream of the guide roller, forms a second obtuse angle β which has the same apex as the angle α and is greater than α but less than 180°, and the pressure belt being pressed on to the conveyor belt by a holding-down roller.

The apparatus of the invention will be explained in more detail with the aid of the diagrammatic representation illustrated in the accompanying drawing.

DESCRIPTION OF THE DRAWING

The apparatus illustrated in the drawing comprises a circulating endless conveyor belt 3 which is led over drive rollers 1 and 2. A stock roll 4 carries a web 5 which is to be coated with plastic and which can be either a separating film or a carrier web. The web 5 travels from the stock roll 4 over roller 1 and beneath a doctor device 6 by means of which a resin film 8 is produced on the carrier web 5. The conveyor belt 3 and the carrier web 5 carried thereon enclose, in their travel from the drive roller 1 to the drive roller 2, an obtuse angle α formed through the provision of a guide roller 7. At the point of contact with this roller, the resin film 8 is combined with a reinforcing material 13; the latter impinges on the resin film from above, but also describes an obtuse angle β, which is larger than the angle α, over the roller 7. The reinforcing web 13 is under tension resulting from cooperation of a brake 10 with an upper rod 11 and a lower rod 12. The positioning of the lower rod 12 is important in this connection. It must be located at a level between that of the drive roller 1 and the guide roller 7, such that the reinforcing web is led to the resin-bearing web 5 below the horizontal, and at an acute angle. As a result of these measures, a vertical force component is exerted at the tangent point of the roller 7, which effects complete impregnation and squeezes out the air, which can escape unhindered in an upward direction. This vertical force component may be varied by varying the angle β or by altering the position of the lower rod 12 or by variation of the brake 10. It is also important that the rod 12 should be so located that it does not touch the resin film—otherwise resin deposition would occur on the rod and could, through hardening, lead to uneven resin application and to operating faults. If the reinforcing material consists of individual filaments 9, these are brought together at the brake 10.

After passing the roller 7, the resin combined with the reinforcing material is led onwards for a certain distance before it comes into contact with a pressure belt 17. In this zone, pre-curing may take place, if desired. The pressure belt, driven by rollers 14 and 15, is pressed, by means of a holding-down roller 16, against the resin-impregnated web present on the conveyor belt 3, and in this zone the heat required for curing is also provided by a heating system.

Figure 1:
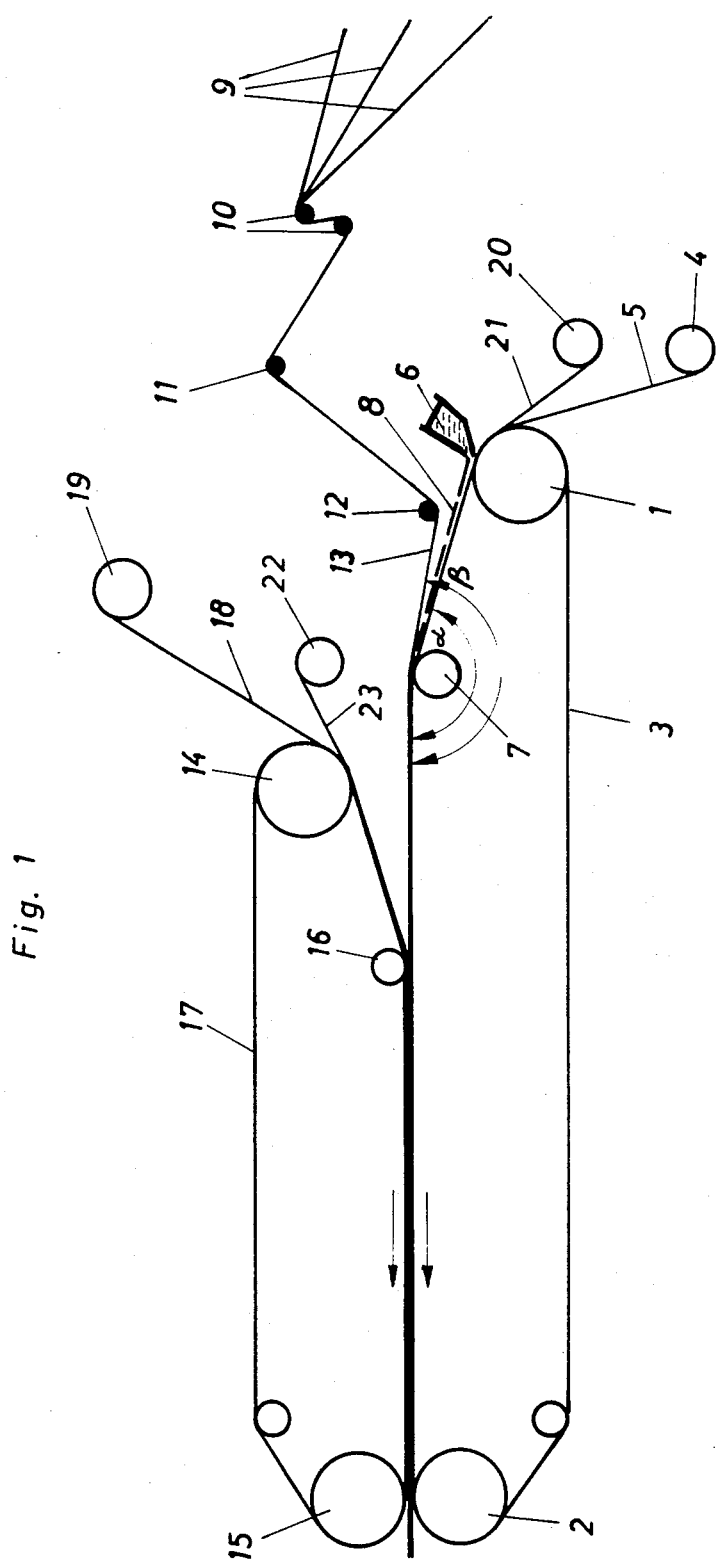

If it is intended to use a covering film or web 18, this is led from a stock roll 19, conjointly with the pressure belt 17, on to the resin-impregnated material. If a covering film intended to remain on the prepreg formed is not used, a separating film is applied at this point.

If the covering film is a top film for the finished laminate, it additionally may be coated with adhesive before reaching the roller 14. Also, if desired a decorative film 21, supplied from a stock roll 20, may be used. Equally, a decorative film 23 additionally may be supplied from the roll 22.

The Examples which follow are intended to illustrate the present invention in more detail. The reference numbers employed in the Examples correspond to those used in the drawing, and the parts mentioned are parts by weight.

EXAMPLE 1

A resin mixture comprising 100 parts of bisphenol A diglycidyl ether, 10 parts of cyanamide and 0.5 part of dimethylbenzylamine is applied, in a thickness of 0.45 mm, by means of a doctor 6 to a silicone paper coming from the roll 4. At the tangent point of the roller 7, pre-tensioned 2,400 tex glass rovings (3 filaments per cm) are forced, at an acute angle, into the resin film, the resin still being in the uncured state (A-state). Immediately after leaving the roller 7, the resin is pre-gelled, without application of pressure, by heating the conveyor belt to 100° C. After passing the roller 16, where a silicone paper is supplied, curing takes place under pressure at 180° C., with a transit time of 3 minutes. The laminate leaving the press has a thickness of 0.7 mm and a glass content of about 70%.

EXAMPLE 2

Following the procedure described in Example 1, a glass fiber fabric weighing 700 g/m$^2$ is impregnated with an 0.45 mm thick resin layer and cured. An 0.7 mm thick laminate containing 70% of glass fibers is produced.

EXAMPLE 3

Following the same procedure as in Example 1, 940 tex carbon fiber rovings are used as the reinforcing material, and the resin film is 0.25 mm thick. A carbon fiber laminate 0.35 mm thick is produced.

EXAMPLE 4

A resin composed of 80 parts of bisphenol A diglydicyl ether, 20 parts of bisphenol F diglycidyl ether and 13 parts of trimethylenetetramine is applied, as an 0.35 mm thick layer, by means of a doctor 6, to a separating film of silicone-coated paper. Pre-tensioned 2,400 tex glass rovings (2 filaments per cm) are pressed into this resin mixture. After passing the guide roller 7, the material is gelled, without application of pressure, for 3 minutes at 60° C. and then cured for 4 minutes at 80° C. under a pressure of 4 bar. A single-ply laminate, 0.5 mm thick and containing 74% of glass, is produced. If instead of the glass rovings a glass roving fabric weighing 500 g/m$^2$ is employed, a bi-directional laminate 0.5 mm thick is formed.

EXAMPLE 5

Following the procedure described in Example 4, a 1 mm thick ABS is coated with the resin of the composition described in Example 4 and combined with pre-tensioned 2,400 tex glass rovings (2 filaments per cm), and the resin is pre-gelled and cured. A composite component consisting of ABS film and laminate and having a total thickness of about 1.5 mm is produced.

EXAMPLE 6

Following the procedure described in Example 4, a 1 mm thick ABS film is coated with the resin of the composition described in Example 4 and combined with pretensioned 2,400 tex glass rovings (2 filaments per cm), and the resin is pre-gelled as in Example 4 and is covered, at the pressure point provided by the roller 16, with a 1 mm thick ABS film, printed on its top face, which film comes from the roll 19 and travels conjointly with the pressure belt. After curing as in Example 4, a decorative composite article, comprising ABS-laminate-ABS and having a total thickness of 2.5 mm, is produced.

If instead of the ABS sheet used as the carrier, an 0.5 mm thick, oxidatively pre-treated aluminum foil is fed onto the roller 1 and thereafter the procedure followed is as in Example 6, a decorative composite article, comprising aluminum-laminate-ABS and having a total thickness of 2 mm, is obtained.

EXAMPLE 7

A silicone paper coming from the roll 4 is coated, by means of a doctor 6, with an 0.5 mm thick layer of a resin mixture comprising 100 parts of bisphenol A diglycidyl ether, 10 parts of cyanamide and 0.5 part of dimethylbenzylamine. At the point of contact with the roller 7, this resin film is combined with a glass mat weighing 400 g/m$^2$ and is pre-gelled by warming to 100° C. Immediately prior to the pressure point, an α-cellulose paper provided with a decorative pattern is supplied, and this paper becomes completely impregnated due to the pressure. After a curing time 3 minutes at 180° C., an 0.5 mm thick laminate panel is formed.

We claim:

1. A process for the continuous preparation of a single-ply or multi-ply reinforced web of a heat-curable resin which comprises applying a continuous resin film, by doctoring, on to a travelling web of a separating film or a film impermeable to synthetic resin, which web, in its travel, forms an obtuse angle α, with its apex at the top, and runs substantially horizontally after passing the apex, the resin film being applied before the apex is reached and the web, carrying the resin film being combined, at the apex, with a pre-tensioned web, which also runs at an obtuse angle β with its apex at the top, of a fiber material or absorbent foam, the angle β being greater than the angle α but less than 180°, and having its apex, and its second viewed in the direction of travel substantially horizontal arm in common with the angle α and subsequently curing the resin-carrying web thus formed under pressure.

2. A process according to claim 1, in which, before the resin-carrying web is cured, one or more films selected from the group consisting of separating films, decorative films, resin-impermeable covering films, adhesive-coated decorative films or adhesive-coated resin-impermeable covering films are fed onto the resin-carrying web.

3. A process according to claim 1, in which the web to be coated with resin is resin-repellent or the resin to be applied is provided with agents which present bonding to the web, and the web is a conveyor web or separating film which does not combine with the web.

4. A process according to claim 1, in which the web to be coated with resin is a carrier web for the reinforced plastic web which is to be produced.

5. A process according to claim 1, in which before application of the resin, a web which is permeable to synthetic resin or possesses a decorative pattern or a print is fed on to the carrier web and is then coated with the resin.

6. A process according to claim 2, in which the covering film employed is a film of a thermoplastic, which film is applied, under pressure, to a side of the resin-impregnated carrying web after passing the apex, the resin having been cured before application of the covering film, but after passing the apex, by exposure to heat, until it reaches the B-state.

* * * * *